J. W. COLLINS.
HAYFORK.
APPLICATION FILED AUG. 3, 1920.
1,408,342.
Patented Feb. 28, 1922.
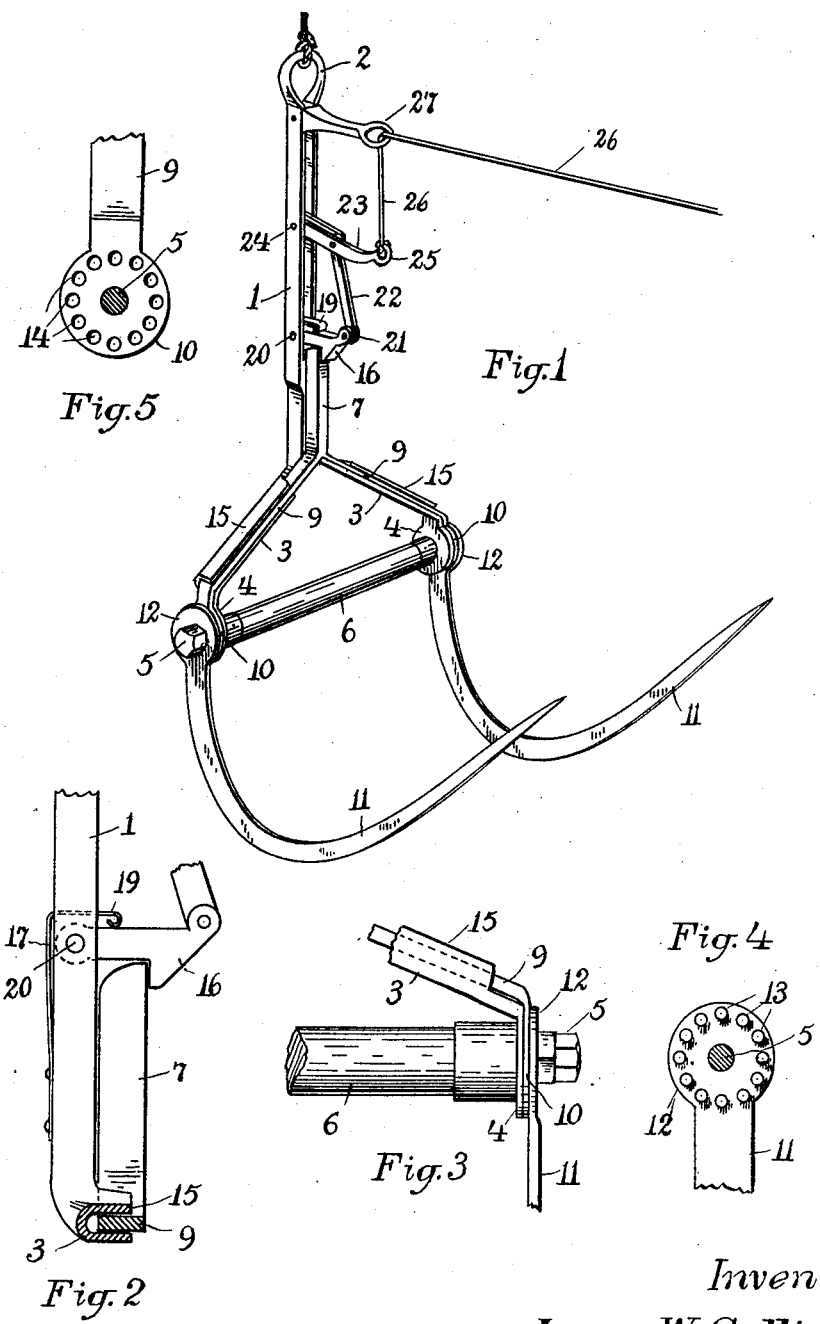
Inventor,
James W. Collins;
By A. B. Upham,
Attorney.

UNITED STATES PATENT OFFICE.

JAMES W. COLLINS, OF SOMERVILLE, MASSACHUSETTS.

HAYFORK.

1,408,342.  Specification of Letters Patent.  Patented Feb. 28, 1922.

Application filed August 3, 1920. Serial No. 401,005.

*To all whom it may concern:*

Be it known that I, JAMES W. COLLINS, a citizen of the United States, and a resident of Somerville, in the county of Middlesex and Commonwealth of Massachusetts, have invented certain new and useful Improvements in Hayforks, of which the following is a full, clear, and exact specification.

This invention is in the line of forks for carrying and depositing hay in the haymows of barns, the forks being designed to enter and elevate a quantity of hay and to travel with the same to a distant part of the hay-mow, where a rope-operated trip permits the forks to tip and deposit the load.

My invention has for its object the effecting of various improvements in details of construction of such a hay fork whereby, first, the forks are rendered easily adjustable to enable them to seize and carry various sizes of bundles of hay; second, to means for strengthening parts thereof; third, to an improved tripping means.

In the drawings forming part of this specification, Fig. 1 is a perspective view of a hay fork embodying my improvements. Fig. 2 is a partly sectional detail view showing the locking detent, and the strengthening means. Fig. 3 is an elevation of one of the pivotal supports for the fork. Fig. 4 is a face view of one of the fork clutch members. Fig. 5 is an elevation of a co-operating clutch member.

The supporting instrumentalities of the fork consist of a twin bar comprising spaced members 1 provided with a suspension loop 2 at their upper ends, and bifurcations 3 at their lower ends. Each bifurcation terminates in an eye 4 penetrated by a bolt 5 screwed into an end of a cross bar 6.

The shank 7 of the forks is provided with legs 9 also provided each with an eye 10 at its extremity mounted on a bolt 5, and the fork-tines 11 are each also provided with an eye 12 likewise mounted on a bolt 5; the eyes 10 and 12 are formed with coacting lugs 13 and recesses 14 to cause them to turn together, and yet to permit the tines 11 to be angularly adjusted relative to the legs 9. Thus to adjust the tines, the bolts 5 are unscrewed sufficiently to permit the lugs 13 to be disengaged from the recesses 14, after which the tines are swung up or down to the points desired, and then the bolts are screwed back to hold the lugs and recesses in their new positions, but not so tightly as to prevent the tines and shank from turning thereon.

I have found while using this type of hay forks that the legs 9 will twist under the strain of the heavy bundles of hay carried by the tines 11. To remedy this, I have formed the bifurcations 3 with an elongated lip 15 on each adapted to receive the legs 9, as shown in Figs. 1 and 2, whereby any twisting of the latter is overcome by the clasping members 3 and 15. When the fork is released of its burden by the tripping thereof, and the shank 7 has swung away from the bar 1 and the legs 9 are removed from between the lips 15 and bifurcations 3, there is, of course, no further strain upon the legs and no need for their strengthening, but when the shank 7 is fastened close against the bar 1 by the detent 16, and the strain of a heavy load is on the tines 11, then the need for the strengthening lips is great.

For ensuring the hold of the detent 16 upon the end of the shank 7, I provide an L-shaped leaf spring 17 attached to the back of the bar 1 at the extreme portion of its long arm, and having its short arm 19 reaching through between the two members of the bar and pressing down upon the detent 16, which is pivotally supported at 20. For releasing the shank from the detent, the latter is formed with a terminal ear 21 to which is pivoted a link 22 whose upper end is pivoted to the lever 23 at an intermediate point. This lever is pivoted to the bar 1 at 24 and has at its outer end an eye 25 to which is attached a heavy cord 26 passing upward through a loop 27 and thence horizontally to the hand of the person whose duty it is to trip the fork. By employing the lever 23 the cord 26 does not require to be pulled so strongly as it would were it attached directly to the ear 21.

To adapt the fork for loads of different weights, the bolts 5 are screwed outwardly to permit the disengagement of the lugs 13 and recesses 14, and then the tines are adjusted to hang more nearly vertical or less so, according to the size of the load desired. If a larger load is wished, the tines are adjusted to a more nearly vertical position for the substantially straight sections of their extremities, when both they and the shank 7 are hanging free. Then, when the fork is permitted to drop into the hay upon the hay rack it will embrace a large load when the bar 1 is tipped over to engage the detent 16 with the shank 7 and is then pulled upward.

But when the tines are adjusted to hang less vertically, they will embrace a smaller armful as they descend into the hay.

The fork being thus loaded, it is raised to the proper level and moved along its trolley to the desired section of the barn or hay loft, after which the cord 26 is pulled and the fork both made to dump its load and to be drawn back to its starting point.

What I claim is:

1. A hay fork comprising a vertical bar having bifurcated lower ends, a shank having legs, and fork-tines pivotally supported by said bifurcations and legs, said tines being angularly adjustable with respect to said legs, the bar having a detent for confining said shank in contact therewith.

2. A hay fork comprising a vertical bar having bifurcated lower ends, each end having an eye, a cross bar, a bolt penetrating each eye and screwing into an end of said cross bar, a shank having legs each having an eye penetrated by one of said bolts, and tines each having an eye penetrated by one of said bolts, the eyes of said legs and tines having coacting lugs and recesses for permitting angular adjustment of the tines, the vertical bar having a detent for confining said shank in contact therewith.

3. A hay fork comprising a vertical bar having bifurcated lower ends, each end having an eye, a cross bar, a bolt penetrating each eye and screwing into an end of said cross bar, a shank having legs each having an eye penetrated by one of said bolts, and tines each having an eye penetrated by one of said bolts, the eyes of said tines being provided with lugs and the eyes of said legs being provided with recesses adapted to receive said lugs for the angular adjustment of said tines.

4. A hay fork comprising a vertical bar having bifurcated lower ends, a shank having legs, and tines connected with said legs, said legs being pivotally supported by said bifurcated ends, each bifurcation being provided with an elongated lip adapted to receive between it and the associated bifurcation one of said legs for the purpose of preventing the twisting of the latter when the tines are heavily loaded.

5. A hay fork comprising a vertical bar having its lower end bifurcated, a shank having legs pivoted to the bifurcated ends, fork tines carried by the said legs, a detent pivoted to said bar and adapted to engage the end of said shank, a lever arm pivoted at one end to said bar above said detent, a rod pivoted to the end of said detent and to an intermediate point of said lever arm, said bar having an eye located above said lever arm, and a cord attached to the free end of said lever arm and passing through said eye to within reach of the operator.

In testimony that I claim the foregoing invention, I have hereunto set my hand this 31st day of July, 1920.

JAMES W. COLLINS.